US006710721B1

(12) United States Patent
Holowick

(10) Patent No.: US 6,710,721 B1
(45) Date of Patent: Mar. 23, 2004

(54) RADIO FREQUENCY AUTOMATED METER READING DEVICE

(75) Inventor: Erwin Holowick, Manitoba (CA)

(73) Assignee: Datamatic Inc., Plano, TX (US)

( * ) Notice: Subject to any disclaimer, the term of this patent is extended or adjusted under 35 U.S.C. 154(b) by 0 days.

(21) Appl. No.: 09/419,743

(22) Filed: Oct. 16, 1999

(51) Int. Cl.$^7$ ............................................. G08B 23/00
(52) U.S. Cl. ......................... 340/870.02; 340/870.07; 375/220; 702/62
(58) Field of Search ..................... 340/870.02, 870.03, 340/870.06, 870.07, 870.11; 375/220; 702/61, 62

(56) References Cited

U.S. PATENT DOCUMENTS

| | | | | |
|---|---|---|---|---|
| 4,204,115 A | * | 5/1980 | Boldridge, Jr. | 250/227.11 |
| 4,614,945 A | * | 9/1986 | Brunius et al. | 340/870.03 |
| 4,796,027 A | * | 1/1989 | Smith-Vaniz | 340/870.03 |
| 4,803,632 A | * | 2/1989 | Frew et al. | 705/412 |
| 4,940,976 A | * | 7/1990 | Gastouniotis et al. | 340/870.02 |
| 5,056,107 A | * | 10/1991 | Johnson et al. | 340/870.03 |
| 5,078,785 A | * | 1/1992 | Ibaraki et al. | 75/386 |
| 5,214,587 A | * | 5/1993 | Green | 702/60 |
| 5,239,575 A | * | 8/1993 | White | 340/870.02 |
| 5,448,230 A | * | 9/1995 | Schanker et al. | 340/870.03 |
| 5,553,094 A | * | 9/1996 | Johnson | 375/200 |
| 5,621,735 A | | 4/1997 | Rochester, Jr. et al. | 370/346 |
| 5,659,303 A | * | 8/1997 | Adair | 340/870.02 |
| 5,818,725 A | * | 10/1998 | McNamara et al. | 340/870.02 |
| 5,924,051 A | * | 7/1999 | Provost et al. | 702/61 |
| 5,953,371 A | * | 9/1999 | Rowsell et al. | 340/870.03 |
| 5,963,146 A | * | 10/1999 | Johnson et al. | 340/870.01 |
| 5,963,650 A | * | 10/1999 | Simionescu et al. | 705/63 |
| 6,078,785 A | * | 6/2000 | Bush | 340/870.02 |
| 6,115,676 A | * | 9/2000 | Rector et al. | 340/870.02 |
| 6,181,257 B1 | * | 1/2001 | Meek et al. | 340/870.02 |
| 6,184,798 B1 | * | 2/2001 | Egri | 340/870.03 |
| 6,195,018 B1 | * | 2/2001 | Ragle et al. | 340/870.01 |
| 6,351,223 B1 | * | 2/2002 | DeWeerd et al. | 340/870.03 |

* cited by examiner

Primary Examiner—Albert K. Wong
(74) Attorney, Agent, or Firm—Robert C Klinger; Jackson Walker LLP

(57) ABSTRACT

A radio frequency automated meter reading (AMR) device for determining quantities of a consumed utility product including electric, gas and water service. The present invention intermittently transmits utility product consumption as a modulated RF signal, and does not require complex polling and bi-directional communication. Data is obtained and formatted for transmission and is adapted to be received by a remote receiving device having an RF receiver. The present invention is adaptable to water meters, gas meters and electric meters, and has an IR programming module facilitating remote programming and diagnostic procedures. In the case of water and gas meters, an internal lithium battery provides an operational life of up to ten years. In the case of the electric meter, power is tapped directly from the electric service.

13 Claims, 17 Drawing Sheets

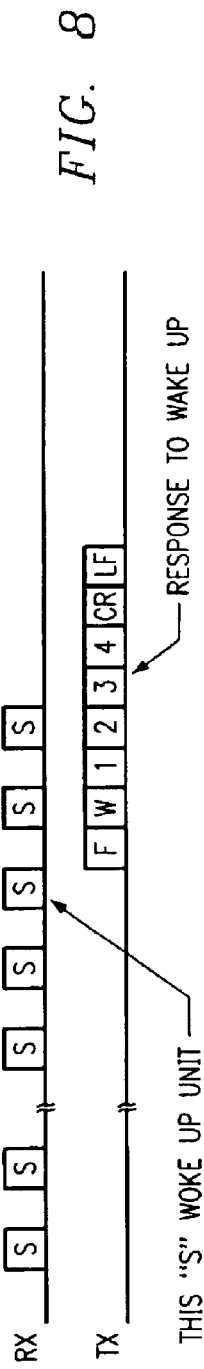
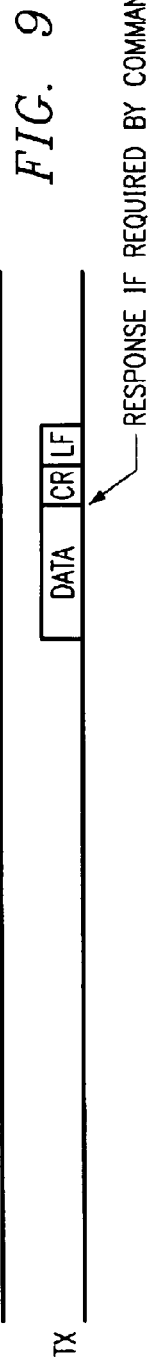
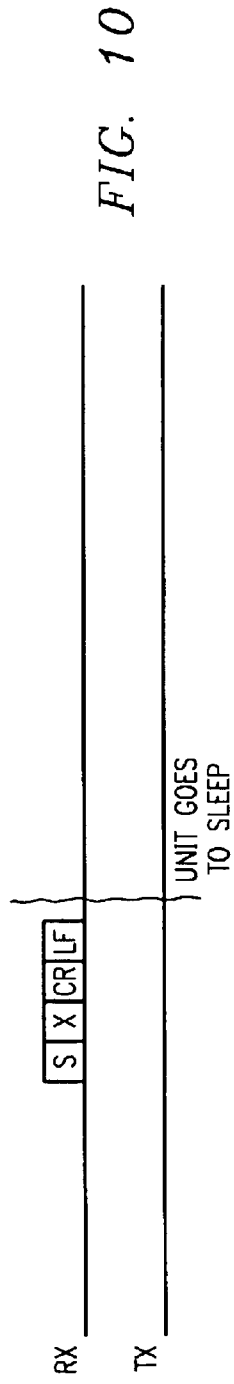
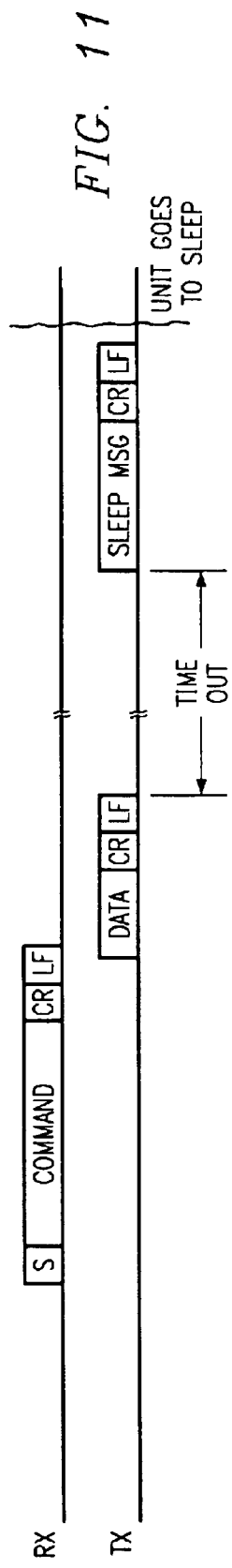
FIG. 8
FIG. 9
FIG. 10
FIG. 11

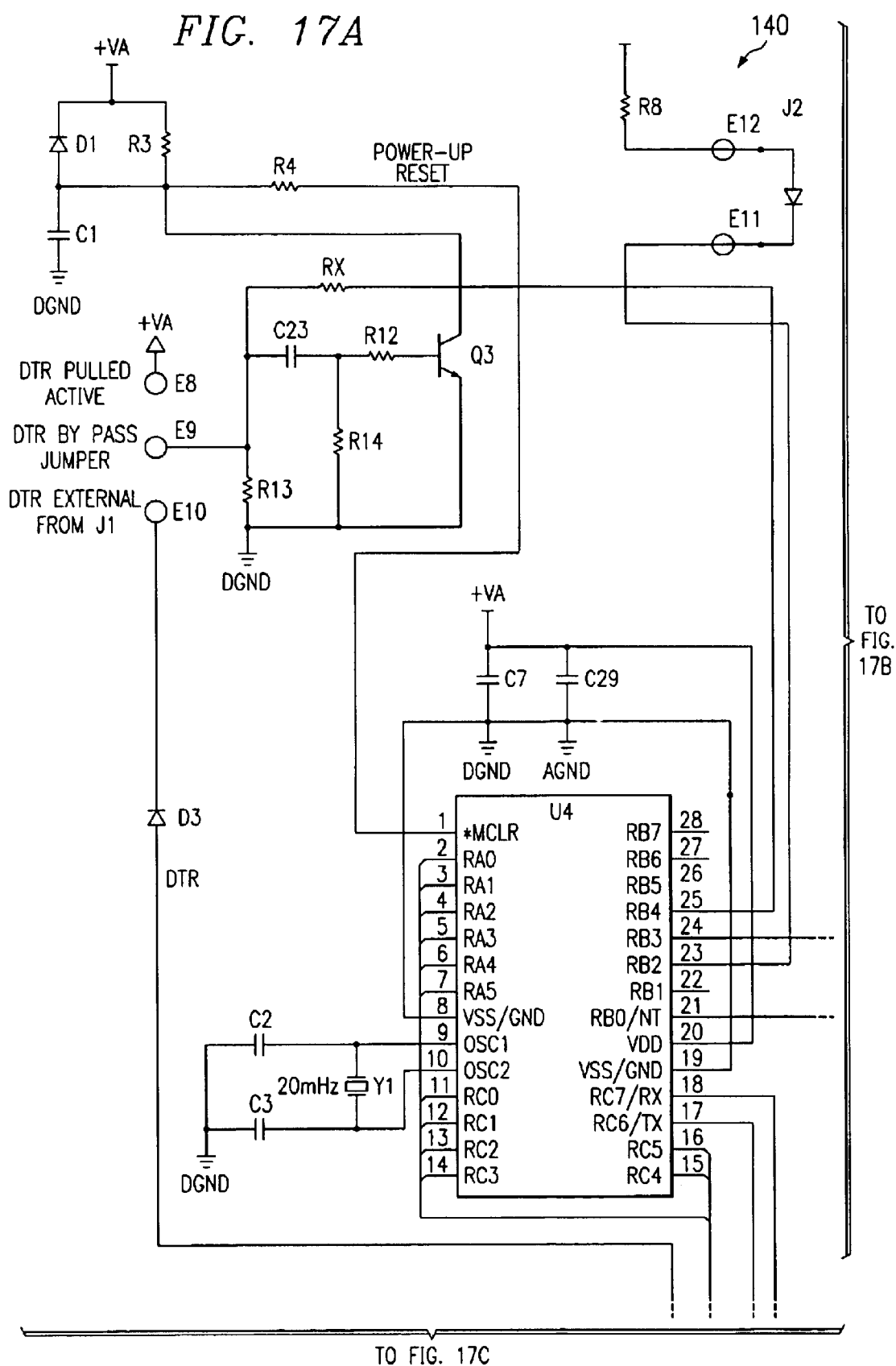

RADIO FREQUENCY AUTOMATED METER READING DEVICE

FIELD OF THE INVENTION

The present invention is generally related to utility meter reading devices, and more particularly to automated devices utilized to remotely and efficiently obtain meter readings of utility meters providing electric, gas and water service.

BACKGROUND OF THE INVENTION

Organizations which provide electric, gas and water service to users are commonly referred to as "utilities". Utilities determine charges and hence billings to their customers by applying rates to quantities of the service that the customer uses during a predetermined time period, generally a month. This monthly usage is determined by reading the consumption meter located at the service point (usually located at the point where the utility service line enters the customer's house, store or plant) at the beginning and ending of the usage month. The numerical difference between these meter readings reveals the kilowatts of electricity, cubic feet of natural gas, or the gallons of water used during the month. Utilities correctly perceive these meters as their "cash registers" and they spend a lot of time and money obtaining meter reading information.

An accepted method for obtaining these monthly readings entails using a person (meter reader) in the field who is equipped with a rugged hand held computer, who visually reads the dial of the meter and enters the meter reading into the hand held. This method, which is often referred to as "electronic meter reading", or EMR, was first introduced in 1981 and is used extensively today. While EMR products today are reliable and cost efficient compared to other methods where the meter reader records the meter readings on paper forms, they still necessitate a significant force of meter readers walking from meter to meter in the field and physically reading the dial of each meter.

The objective of reducing the meter reading field force or eliminating it all together has given rise to the development of "automated meter reading", or AMR products. The technologies currently employed by numerous companies to obtain meter information are:

Radio frequency (RF)
Telephone
Coaxial cable
Power line carrier ("PLC")

All AMR technologies employ a device attached to the meter, retrofitted inside the meter or built into/onto the meter. This device is commonly referred to in the meter reading industry as the Meter Interface Unit, or MIU. Many of the MIU's of these competing products are transceivers which receive a "wake up" polling signal or a request for their meter information from a transceiver mounted in a passing vehicle or carried by the meter reader, known as a mobile data collection unit ("MDCU"). The MIU then responsively broadcasts the meter number, the meter reading, and other information to the MDCU. After obtaining all the meter information required, the meter reader attaches the MDCU to a modem line or directly connects it to the utility's computer system to convey the meter information to a central billing location. Usually these "drive by" or "walk by" AMR products operate under Part 15 of the FCC Rules, primarily because of the scarcity of, or the expense of obtaining, licenses to the RF spectrum. While these types of AMR systems do not eliminate the field force of meter readers, they do increase the efficiency of their data collection effort and, consequentially, fewer meter readers are required to collect the data.

Some AMR systems which use RF eliminate the field force entirely by using a network of RF devices that function in a cellular, or fixed point, fashion. That is, these fixed point systems use communication concentrators to collect, store and forward data to the utilities central processing facility. While the communication link between the MIU and the concentrator is almost always either RF under Part 15 or PLC, the communication link between the concentrator and the central processing facility can be telephone line, licensed RF, cable, fiber optic, public carrier RF (CDPD, PCS) or LEO satellite RF. The advantage of using RF or PLC for the "last mile" of the communication network is that it is not dependent on telephone lines and tariffs.

There is desired an improved meter reading device and methodology which improves upon the available AMR products through simplification and ease of use.

SUMMARY OF THE INVENTION

The present invention achieves technical advantages as an AMR device and method of use which is adapted to couple to utility meters to obtain data including a measured quantity of delivered product, and further including control circuitry and a transmitter generating a data signal indicative of the measured quantity at a particular RF frequency and predetermined time interval, without requiring external polling. The control circuitry generates the data signal periodically at a first predetermined time interval which can be selectively programmed via a programming module by a separate programming or diagnostic device. The present invention achieves technical advantages by not requiring external polling to obtain data, thereby simplifying the data collection process by eliminating complicated data exchange protocols and simplifying the equipment required (i.e. using a transmitter at the MIU instead of a transceiver).

The present invention comprises a device having an interface module adapted to couple to a utility meter measuring a quantity of a delivered product, the interface module providing a first signal indicative of the measured quantity. The device further comprises a controller receiving the first signal and generating a data signal indicative of the measured quantity at a first predetermined time interval, without requiring external polling. A transmitter responsively coupled to the controller circuit modulates the data signal, and transmits the modulated data signal at a predetermined RF frequency. Preferably, the controller formats the data signal into a data stream having a plurality of fields. A first field comprises data indicative of the measured quantity of delivered product, i.e. meter reading. Another second field comprises data indicative of an identity of the measuring unit. The device is particularly adapted to obtain the measured quantity of delivered product comprising of electricity, natural gas and water, and can be adapted to other meters delivering product as well.

The present invention further comprises a programming module functionally coupled to the controller and adapted to selectively adjust operating parameters of the controller. The programming module is adapted to selectively adjust, for instance, the predetermined time interval between transmissions of the modulated data signal, for instance, allowing the data to be selectively transmitted ever 10 seconds, ever minute, once an hour, and so forth. The programming module comprises a transceiver adapted to provide data to a diagnostic and programming device indicative of operating characteristics of the device, including any changes of device performance, battery levels, and further allowing the reception of data such as to update of internal software via downloading through the transceiver when desired. The interface module preferably comprises an optical sensor and optical transmitter, such as an Infrared (IR) transceiver.

According to a second embodiment of the present invention, there is provided a method of transmitting a data signal comprising the steps of sensing a utility meter measuring a quantity of a delivered product, and responsively generating a first signal indicative of the sensed measured quantity. The data signal is formatted and has a plurality of fields, wherein a first field is indicative of the sensed measured quantity of product. This formatted data signal is modulated and transmitted as a modulated data signal at a predetermined RF frequency. This modulated data signal is preferably transmitted at a predetermined time interval, and advantageously does not require any external polling signal, complicated data exchange protocols, or complicated data exchange algorithms. The method of the present invention further provides the step of adjusting the format of the first signal using a programming device, wherein the programming device comprises an IR transceiver. The measured product may comprise of water, electricity, gas, or other consumed product of a household.

BRIEF DESCRIPTION OF THE DRAWINGS

FIG. 8 is a timing diagram of an initiated wake-up sequence by a remote programming device;

FIG. 9 is a timing diagram of a command/response sequence of the controller to the remote programming device;

FIG. 10 is a timing diagram of a sleep command being provided to the controller;

FIG. 11 is a sleep timing diagram of sequence;

DESCRIPTION OF THE PREFERRED EMBODIMENT

Figure 1:
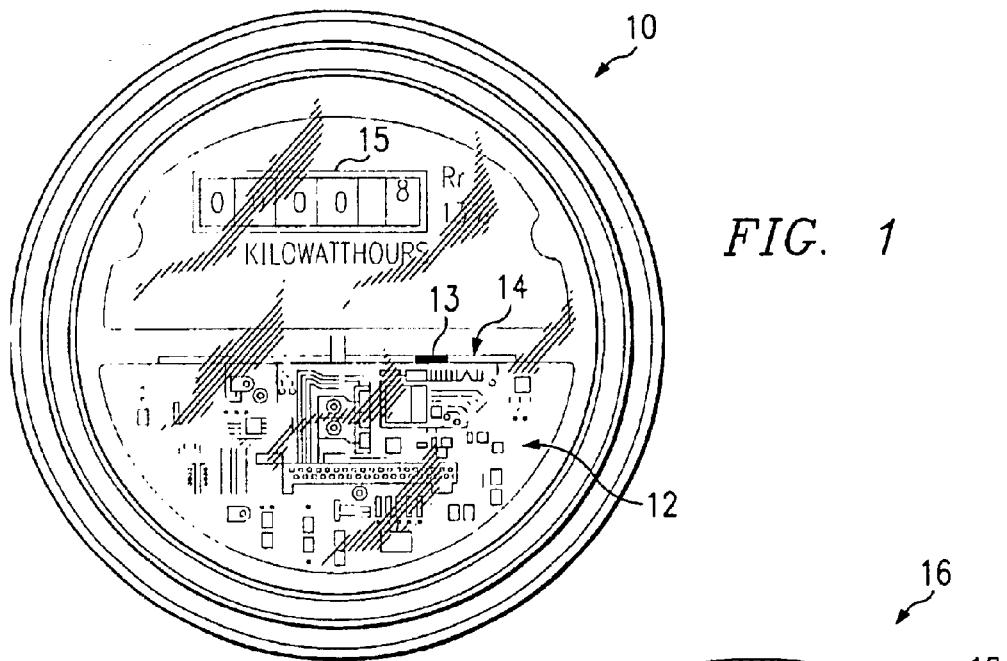
FIG. 1 is a perspective view of a data transmitting module according to the present invention adapted to a household electric meter.

Referring now to FIG. 1, there is illustrated a household electric meter unit generally shown at 10 having adapted therewith an electric meter reading unit 12 according to a first preferred embodiment of the present invention coupled to sense a black spot 13 on the rotating meter disk generally shown at 14. Electric meter unit 12 has an optical sensor for detecting the passing of the back spot 13 there past to ascertain the consumed amount of electricity correlated to the read out of the visual display 15 of meter unit 10.

Figure 2:
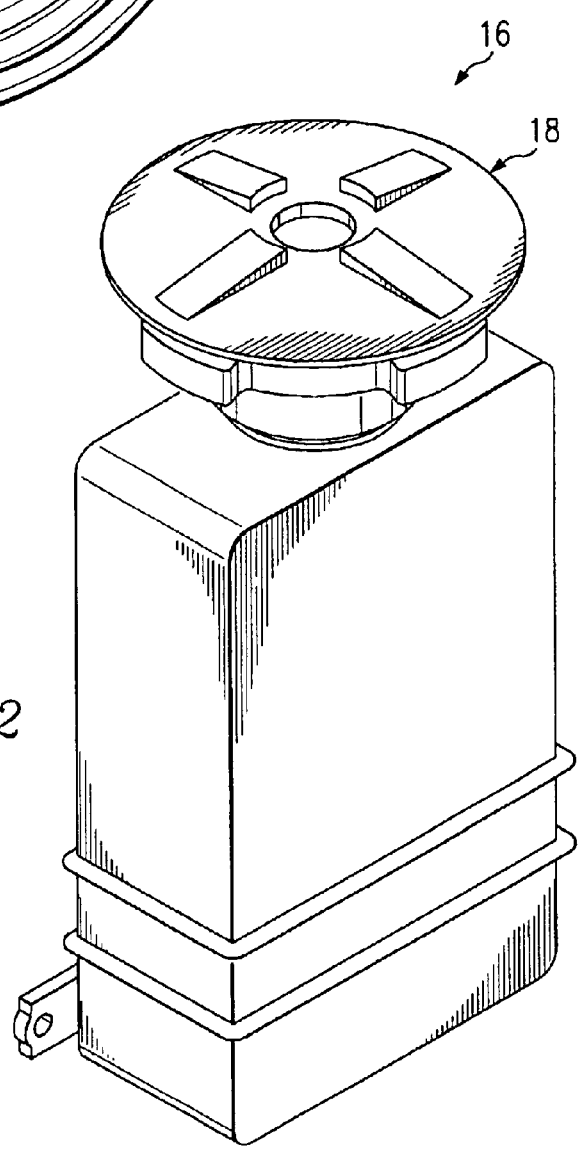
FIG. 2 is a perspective view of a data transmitting device according to a second embodiment of the present invention adapted to be fastened onto a water meter pit lid and adapted to read a water meter.

FIG. 2 is the perspective view of a water meter unit according to a second preferred embodiment of the present invention generally being shown at 16. The circular structure 18 on the top of device 16 is adapted to fasten the unit 16 onto a water meter pit lid (not shown) with an antenna node (not shown) sticking up through a hold drilled through the pit lid.

Figure 3:
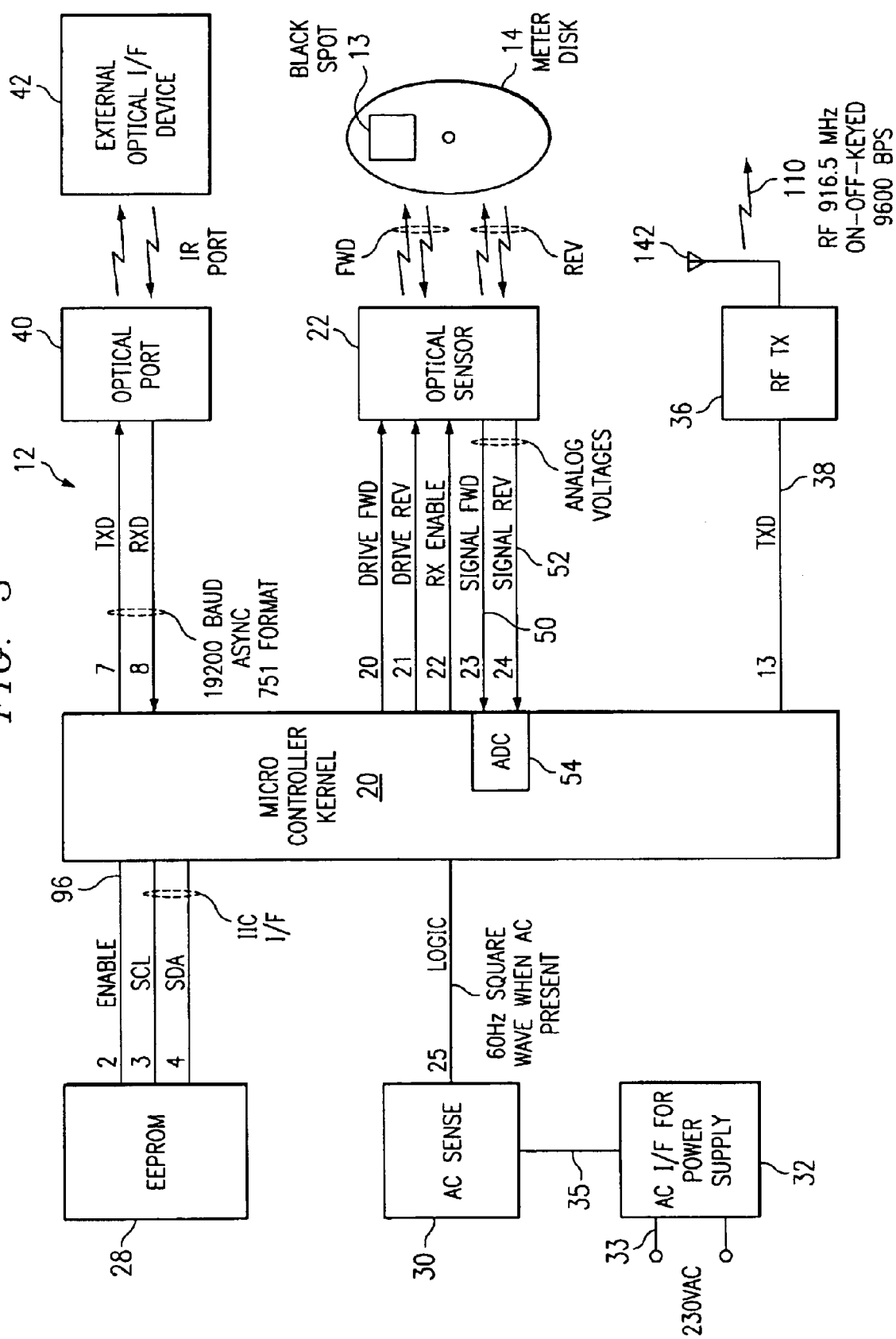
FIG. 3 is a electrical block diagram of an electric meter unit according to the first embodiment of the present invention.

Referring now to FIG. 3, there is illustrated an electrical block diagram of the electric meter unit 12 according to the first embodiment of the present invention. Electric meter unit 12 is seen to include a controller 20, which may comprise of a microcontroller, a digital signal processor (DSP) or other suitable controlling device, preferably being a programmable integrated circuit having suitable software proramming. Device 12 is further seen to include an infrared (IR) optical sensor 22 adapted to sense the passing of the black spot 13 of the metered disk 14 of electric meter unit 10. Optical sensor 22 preferably operates by generating pulses of light using a light emitting diode, and sensing the reflection of light from the meter disk 14, and determining the passing of the black spot 13 by sensing a reduced reflection of the impinging light therefrom.

Electric meter unit 12 is further seen to include a memory device comprising an EE PROM 28 storing operating parameters and control information for use by controller 20. An AC sense module 30 is also coupled to controller 20 and senses the presence of AC power 33 being provided to the meter unit 10 via an AC interface 32.

A radio frequency (RF) transmitter 36 is coupled to and controlled by controller 20, and modulates a formatted data signal provided thereto on line 38. RF transmitter 36 modulates the formatted data signal provided thereto, preferably transmitting the modulated signal at a frequency of about 916.5 MHz at 9600 bits per second (BPS), although other frequencies or data rates are suitable and limitation to this frequency or baud rate is not to be inferred.

A programming optical port 40 is provided and coupled to controller 20 which permits communication between controller 20 and an external optical infrared device 42 used for programming controller 20, and for selectively diagnosing the operation of electric meter unit 12 via the optical port 40. Optical port 40 has an IR transceiver adapted to transmit and receive infrared signals to and from the external device 42 when the external device 42 is disposed proximate the optical port 40 for communication therewith. Device 42 asynchronously communicates with controller in a bidirectional manner via port 40, preferably at 19,200 baud.

Optical sensor 22 communicates via a plurality of signals with controller 20. Optical sensor 22 provides analog voltages indicative of and corresponding to the sensed black spot of disk 24 via a pair of data lines 50 and 52 which interface with an analog to digital controller (ADC) 54 forming a sub-portion of controller 20.

Figure 4:
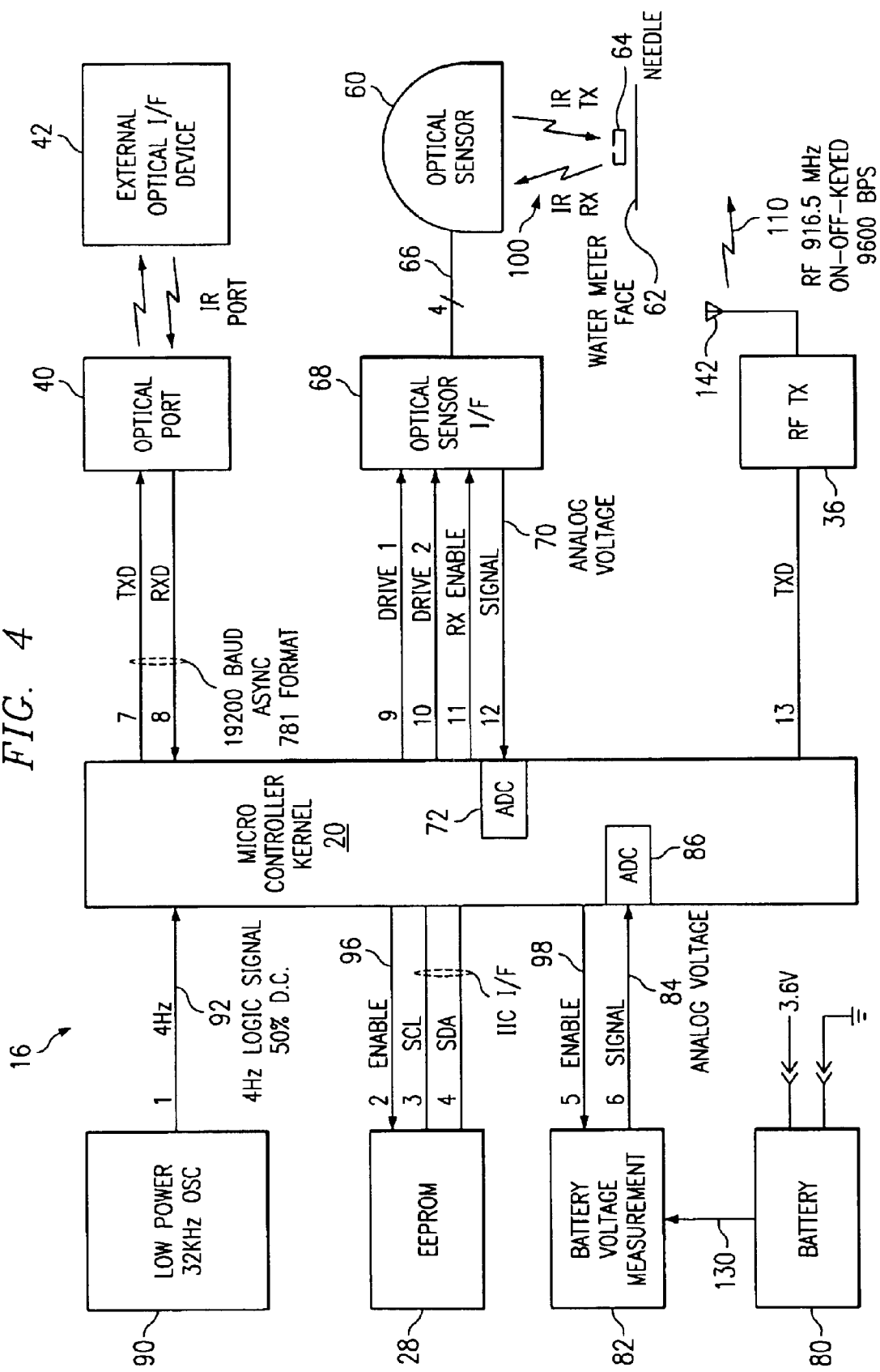
FIG. 4 is an electrical block diagram of a water meter unit according to a second embodiment of the present invention.

Referring now to FIG. 4, there is generally shown detailed electrical block diagram of the water meter unit 16 according to the second preferred embodiment of the present invention, wherein like numerals refer to like elements to those shown in FIG. 3. The water meter unit 16 is substantially similar to the electric meter unit 12 in function, but having some differences necessary for operation with a household water meter unit. Specifically, water meter unit 16 has an optical sensor 60 adapted to be positioned proximate a water meter face 62 having a needle 64, which needle 64 indicates a consumed amount of water communicated through the water meter unit. Optical sensor 60 senses the position of needle 64 via infrared (IR) sensing electronics, and provides the sensed position of needle 64 via communication link 66 to an optical sensor interface 68. The sensed position of needle 64 is provided as a data signal comprising an analog voltage transmitted on line 70 to an ADC 72 of controller 20. In this embodiment, water meter unit 16 is provided with an internal battery 80 powering the microcontroller 20 and other circuitry, preferably being a lithium battery operating at about 3.6 volts. A battery voltage measuring unit 82 senses and measures the current operating voltage of battery 80, and outputs an analog voltage signal indicative thereof on line 84 to an ADC 86 of microcontroller 20. The value of the analog voltage signal on line 84 is a function of the battery voltage of battery 80 and is about 1.2 volts when battery 80 is providing 3.6 volts. The value of the Battery Voltage Measuring circuit is about 1.2V, but the perceived value by the ADC is a function of the ADC Ref voltage, which is the battery voltage. For example, if the ADC measures the 1.2V and it was 33% full scale of the ref voltage (battery voltage), then the battery voltage would be:

1.2 ×1/0.33 =3.6V The 1.2V is constant over a wide battery voltage range.

A low power oscillator 90 operating at about 32 kHz generates a 4 Hz logic interrupt signal to controller 20, which controls the speed of controller 20. By providing only a 4 Hz interrupt signal, microcontroller 20 operates at a very slow speed, and thus consumes very little power allowing water meter unit 16 to operate at up to about 10 years without requiring replacement of lithium battery 80.

The EE PROM 28 is selectively enabled by the microcontroller 20 via an enable line 96, and once enabled, communication between the microcontroller 20 and the EE PROM 28 follows an IIC protocol. Likewise, the battery voltage measuring device 82 is selectively enabled powered by the microcontroller 20 via a control line 98 such that the battery voltage is sensed only periodically by the controller 20 to conserve power.

The optical sensor 60 is controlled by controller 20 via optical sensor interface 68 to determine the water position and presence of meter needle 64. The sensor 60 is attached to the lens of the water meter (not shown). An infrared (IR) signal 100 is periodically transmitted from the sensor 60, and the reflection of the IR signal is measured by the sensor 60 to determine the passage of needle 64. The sensor 60 operates in cyclic nature where the sensing is performed every 250 milliseconds. The intensity of the IR signal transmitted by sensor 60 is controlled by two drivelines on control line 66 from the micro-controller 20. The IR intensity is set according to the optical characteristics of the water meter face. The sensor 60 emits an intense, but short burst of IR light. The IR receiver 68 responsively generates an analog voltage on signal line 70 which voltage is a function of the received IR light intensity from optical sensor 60. This voltage is connected directly to the ADC 72 of the controller 20. The controller 20 measures this converted (digital) signal, and uses the value in an algorithm that ascertains the value over time to determine if the water meter needle has passed under the sensor 60. The algorithm also compensates for the effects of stray light. The mechanical shape of the sensor 60 and orientation of the IR devices, such as light emitting diodes, determines the optical performance of the sensor and its immunity to stray IR light.

The water meter unit 16 periodically transmits a modulated formatted data signal on an RF link 110 that is preferably tuned at 916.5 MHz with on-off-keyed data at 9600 bits per second (9600 baud). The transmitter 36 transmits the data in formatted packets or messages, as will be discussed shortly. These formatted messages are transmitted at a repetition rate that has been initialized into the unit 16, and which may be selectively set between every one second and up to intervals of every 18 hours, and which may be changed via the optical port 40 by the programminge external optical device 42. The formatted messages modulated by the transmitter 36, as will be discussed shortly, contain fields including an opening flag, message length, system number, message type, data, check sum and closing flag, as will be discussed shortly in reference to FIG. 7. The messages are variable length, whereby the message length field indicates how long the message is. The message type field indicates how to parse or decode the data field. Different messages carry and combine different data items. Data items include network ID, cumulative meter reading, clock time, battery voltage, sensor tamper, sensor diagnostic, and trickle flags.

As previously mentioned, low power 32 kHz oscillator 90 generates a 4 Hz square wave output. This signal is connected to the controller 20 which causes an interrupt ever 250 milliseconds. The micro-controller uses this interrupt for clock and timing functions. In normal mode, the microcontroller is asleep and wakes up every 200 milliseconds and performs a scheduling task for about 50 milliseconds. If a task is scheduled to execute, it will execute that task and return to sleep. In normal mode, all tasks are executed within the 250 millisecond window.

In the case of the optical sensor 22 of FIG. 3, the sensor 22 is attached to the electric meter such that the sensor faces the metered disk surface. The IR signal is periodically transmitted from the sensor and the reflection is measured. As the black spot passes under the sensor, a variation in the reflected IR signal occurs. The sensor operates in cyclic nature where the sensing is performed every 33 milliseconds. The IR receiver of sensor 22 generates analog voltages on lines 50 and 52 that is a function of the received IR light intensity and are connected to the ADC 72 in the microcontroller 20. The controller 20 measures this converted (digitized) voltage, and used the value in the algorithm. The algorithm senses the values over time to determine if the black spot has passed under the sensor. To detect reverse rotation of the metered disk, the sensor 22 has two sensors, as shown. The controller 22, with its algorithm, determines the direction of disk rotation as the black spot passes the sensor 22. The black spot is a decal and does not reflect IR light. This is determined by the decal's material, color and surface texture. As with the water meter, the algorithm and sensor shrouding compensate for the effects of stray light.

The AC line interface 32 interfaces to the AC line coupled to the electric meter through a resistive tap. The resistors limit the current draw from the AC line to the electric meter unit 12. The AC is then rectified and regulated to power the unit 12. The AC sensor 30 detects the presence of AC voltage on the AC line 33. The sensed AC is rectified and a pulse is generated by sensor 30. This pulse is provided to the micro-controller 20 where it is processed to determine the presence of adequate AC power.

Figure 5:
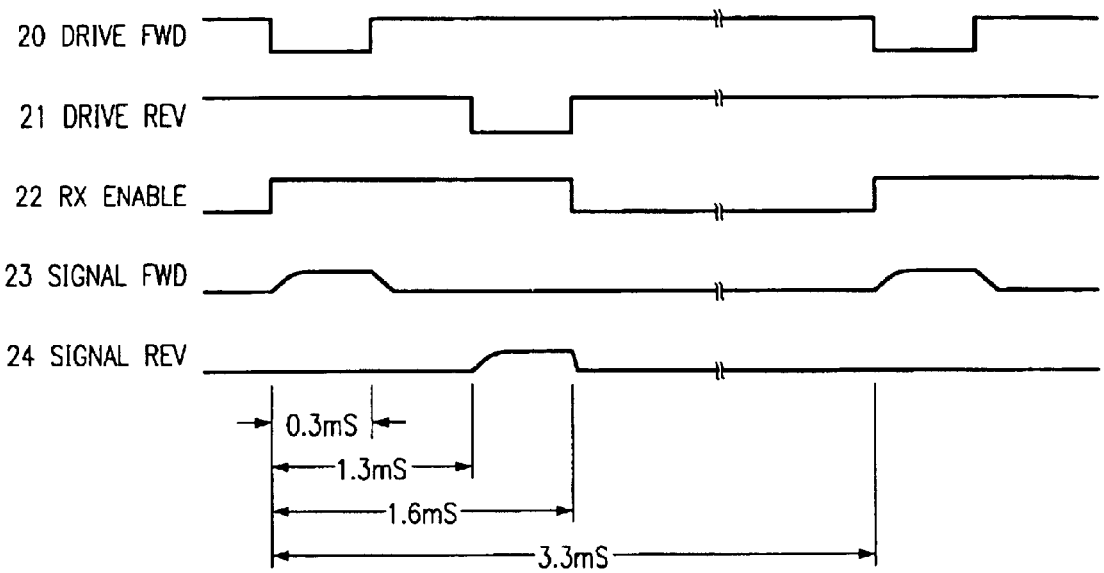
FIG. 5 is a signal timing diagram of the optical sensor unit for the electric meter of FIG. 3.

Referring now to FIG. 5, there is shown a waveform diagram of the signals exchanged between the optical sensor 22 and the controller 20 of the electric meter unit 12 shown in FIG. 3. The logic signals generated by controller 20 control the optical sensor 22 to responsively generate an IR signal and sense a refracted IR signal from the metered disk 24. It can be seen that the reflected 0.3 millisecond IR signal is acquired within 1.3 milliseconds after enabling for sensing by ADC 54 and processed by controller 20. Preferably, this measuring sequence is performed every 33 milliseconds, which periodic rate can be programmed via optical port 40 if desired.

Figure 6:
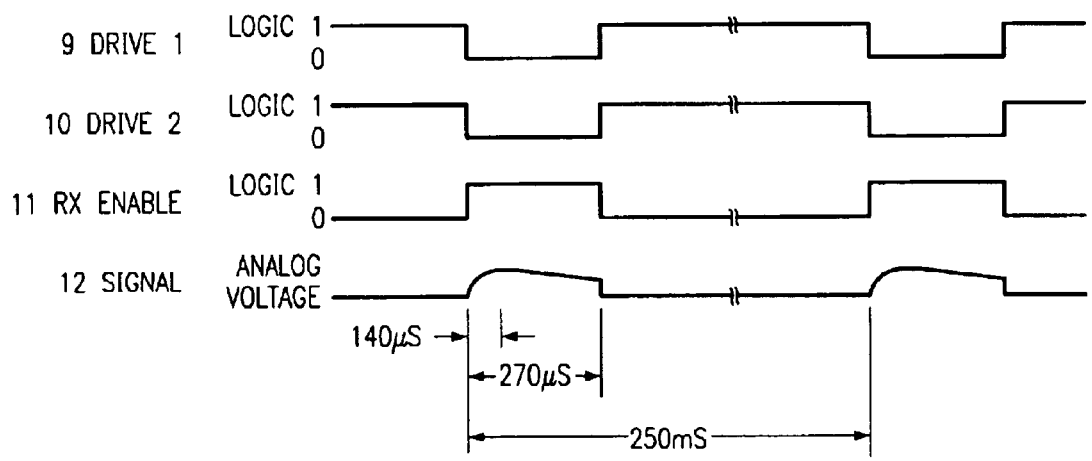
FIG. 6 is a signal timing diagram of the optical sensor of the water meter unit of FIG. 4.

Referring now to FIG. 6, there is shown the timing diagram of the signals between optical sensor 68 and controller 20 for water meter unit 16 of FIG. 4. The logic of the driving signals is shown below in Table 1.

TABLE 1

| Net Sensor Drive | Drive 1 | Drive 2 |
| --- | --- | --- |
| High | 0 | 0 |
| Medium | 0 | 1 |
| Low | 1 | 0 |

As shown in the timing diagram of FIG. 6, the analog signal provided on line 70 by optical sensor 68 rises to an accurate readable voltage in about 140 milliseconds, and has a signal width of about 270 milliseconds. The period of the analog voltage is about 250 milliseconds, corresponding to a signal acquisition rate of 4 Hz corresponding to the timing frequency provided on line 92 to controller 20.

Figure 7:
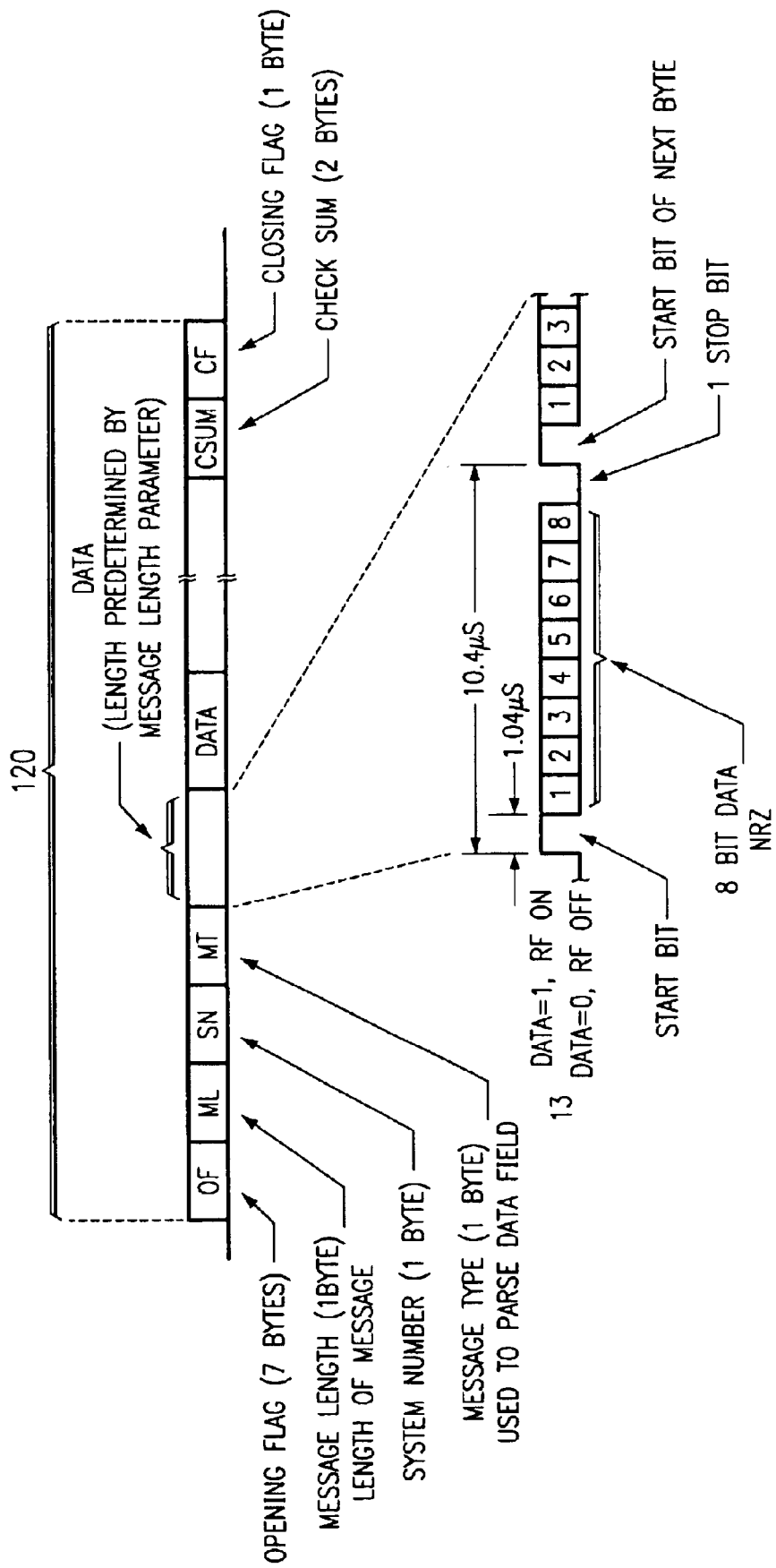
FIG. 7 is a byte data format diagram for the water and electric meter units.

Referring now to FIG. 7, there is shown the message format of the data signal provided by controller 20 on output line 38 to RF transmitter 36. The message is generally shown at 120 and is seen to have several fields including:

opening flag (OF) comprised of two bytes;

message length (ML) having a length of one byte;

system number (SN) having a length of one byte;

message type (MT) one byte;

data, which length is identified by the message length parameter (ML);

check sum (CSUM) two bytes; and closing flag (CF) one byte.

Further seen is the data format of one byte of data having one start bit and 8 bits of data non-returned to zero (NRZ) and one stop-bit. The length of each byte is preferably 1.04 milliseconds in length.

Referring now to FIG. 8, there is illustrated the message format and timing sequence of messages generated between the external optical timing device 42 and microcontroller 20 via optical port 40. As shown in FIG. 8, a plurality of synchronization bytes are provided by device 42 on the receive data (RXD) line to controller 20, and upon the recognition of the several bytes by controller 20, the controller 20 generates a response message to the wake-up message on the transmit data (TXD) line via optical port 40 to the external device 42. Thereafter, shown in FIG. 9, a command data message may be provided by the external device 42 to controller 20 on receive data line RXD, with response data, if required, being responsively returned on the transmit data line TXD to device 42 if required by the command.

As shown in FIG. 10, a sleep command is then generated by external device 42 upon which no response by controller 20 is generated and the unit 12 goes to sleep. As shown in FIG. 11, after a command has been sent to controller 20, and responded to, the unit 12 will time out after a predetermined period of time if no other commands are received, such as 120 seconds, with a message being sent by controller 20 on transmit line TXD indicating to the external device 42 that the unit 12 has gone to sleep.

Figure 12:
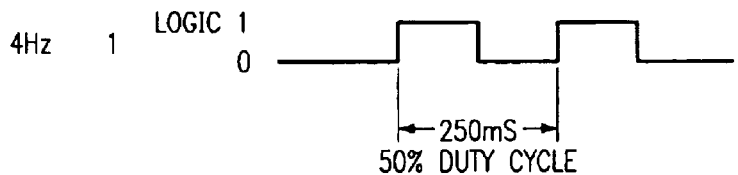
FIG. 12 is a timing diagram of an oscillator of the water meter unit.

The message sequence shown in FIGS. 8–11 applies equally to both the electric unit 12 and the water unit 16. Referring now to FIG. 12, there is illustrated the 4 Hz square wave interrupt signal generated by the low power oscillator 90 to the microcontroller 20.

Figure 13:
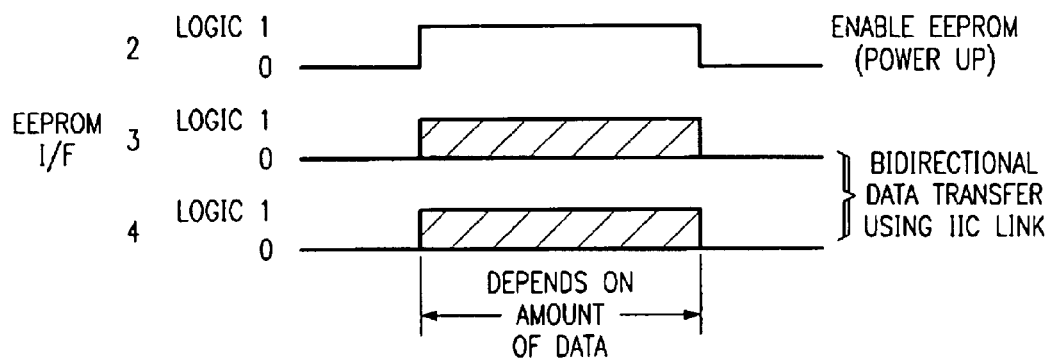
FIG. 13 is a timing diagram of the controller communicating with the EE PROM of the water and electric units.

Referring to FIG. 13, there is illustrated the timing of communications between the EE PROM 28 and the controller 20, whereby the EE PROM is enabled by a logic one signal on line 96, with bidirectional data being transferred using an IIC link on lines SCL, and lines SDA. This applies to both the water unit 16 and the electric unit 12.

Figure 14:
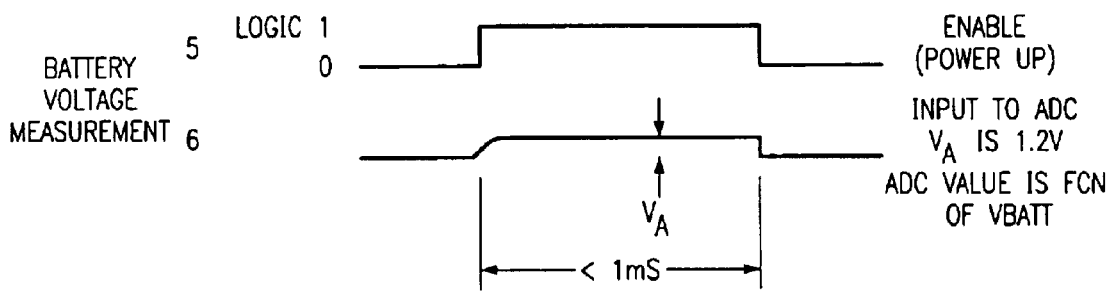
FIG. 14 is a timing diagram of the controller of the water unit measuring interval battery voltages.

Referring to FIG. 14, there is illustrated the timing diagram for sensing the internal battery voltage in the water meter unit 16 shown in FIG. 4. A logic high signal is generated on enable line 98 by controller 20, whereby the battery measuring unit 82 responsively senses the battery voltage via line 130 from DC battery 80. Battery measuring unit 82 responsively provides an analog voltage signal on line 84 indicative of the voltage of battery 80 to the ADC 86 of controller 20. The analog voltage provided on signal line 84 is approximately 1.2 volts when the battery 80 is at full strength, being about 3.6 volts.

Figure 15A:
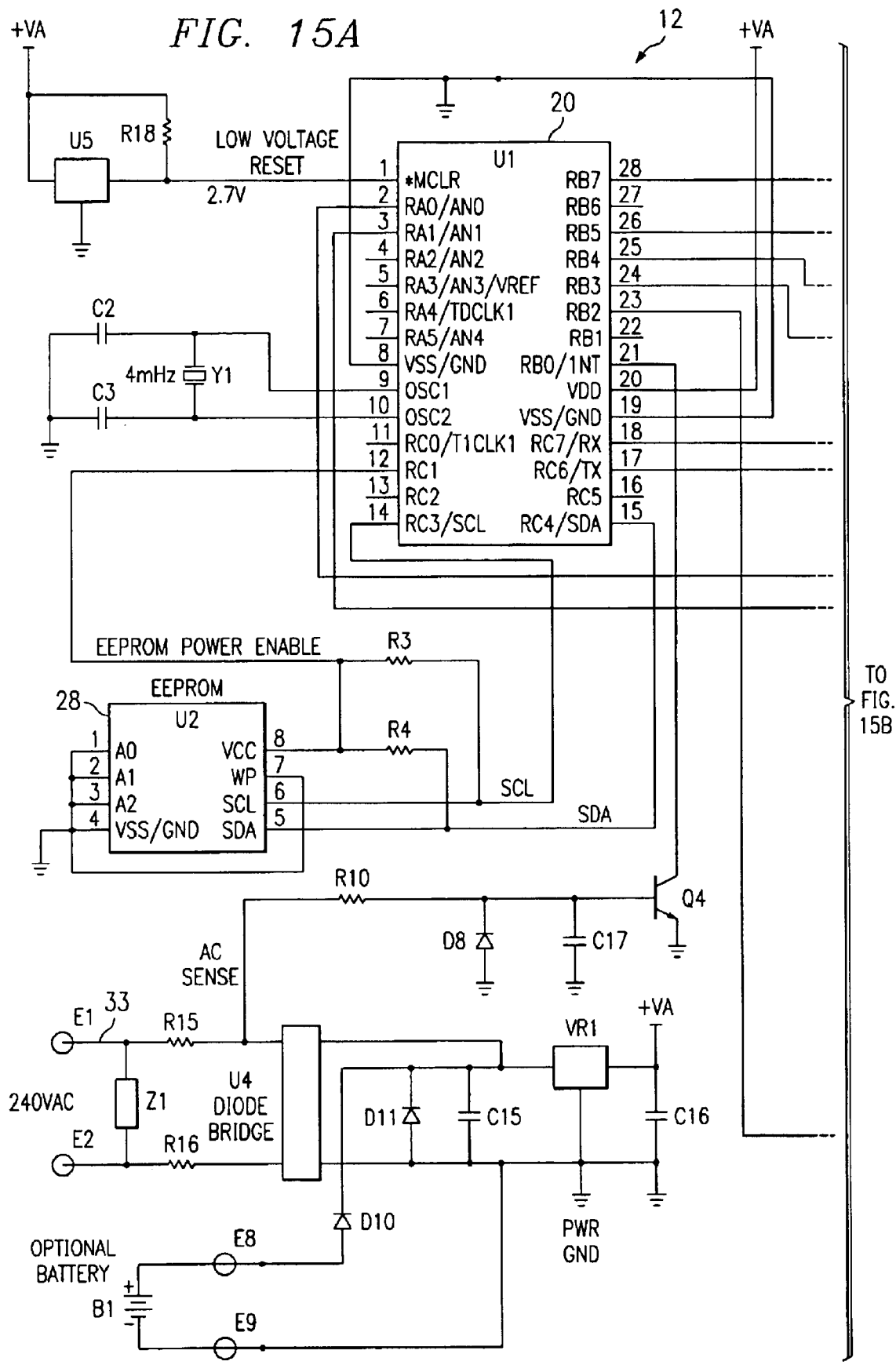
FIG. 15 is a full electrical schematic of the electric meter unit according to the first preferred embodiment of the present invention.
Figure 15B:
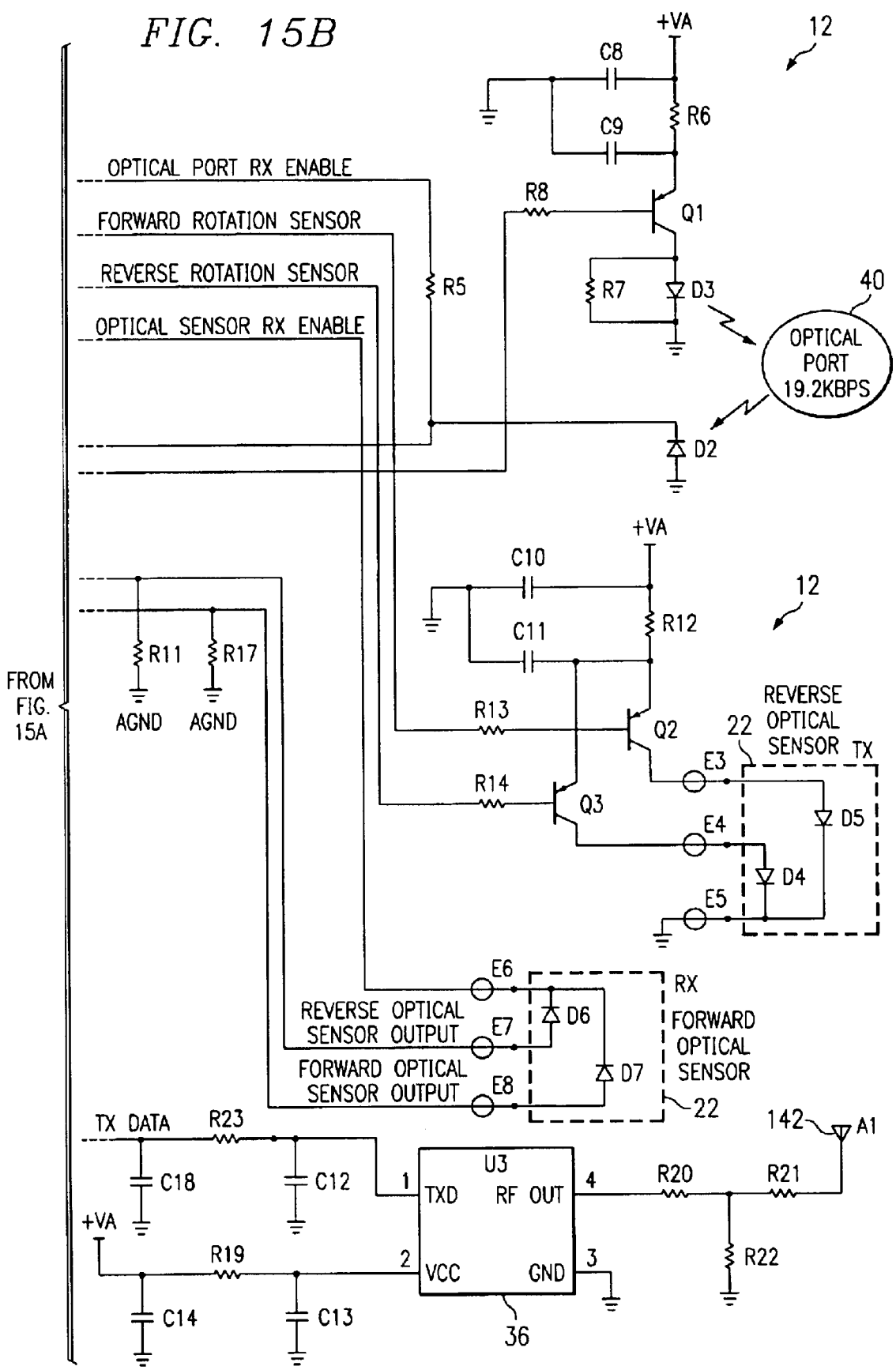
Figure 16A:
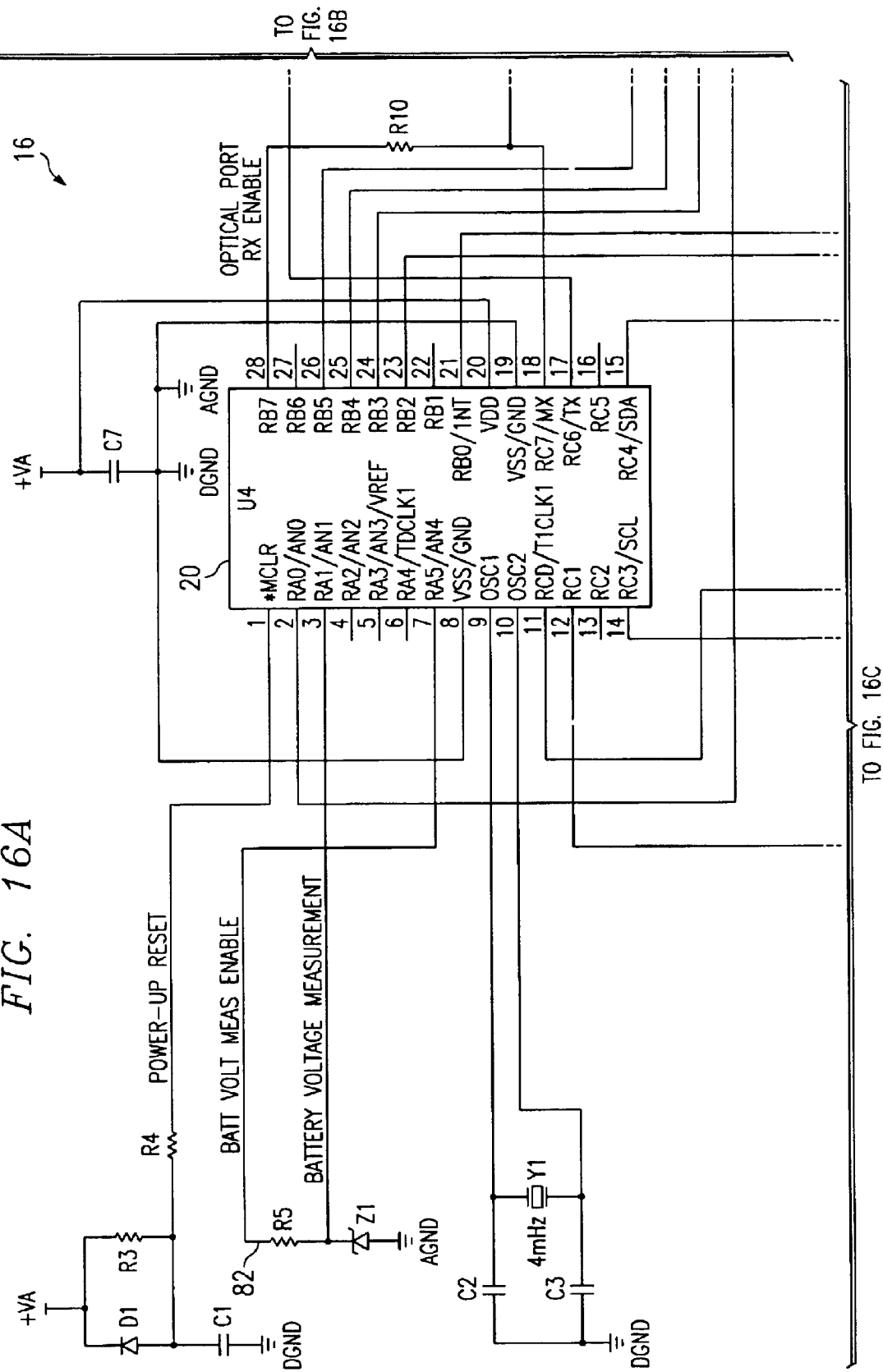
FIG. 16 is a full electrical schematic of the water meter unit according to the second embodiment of the present invention.
Figure 16B:
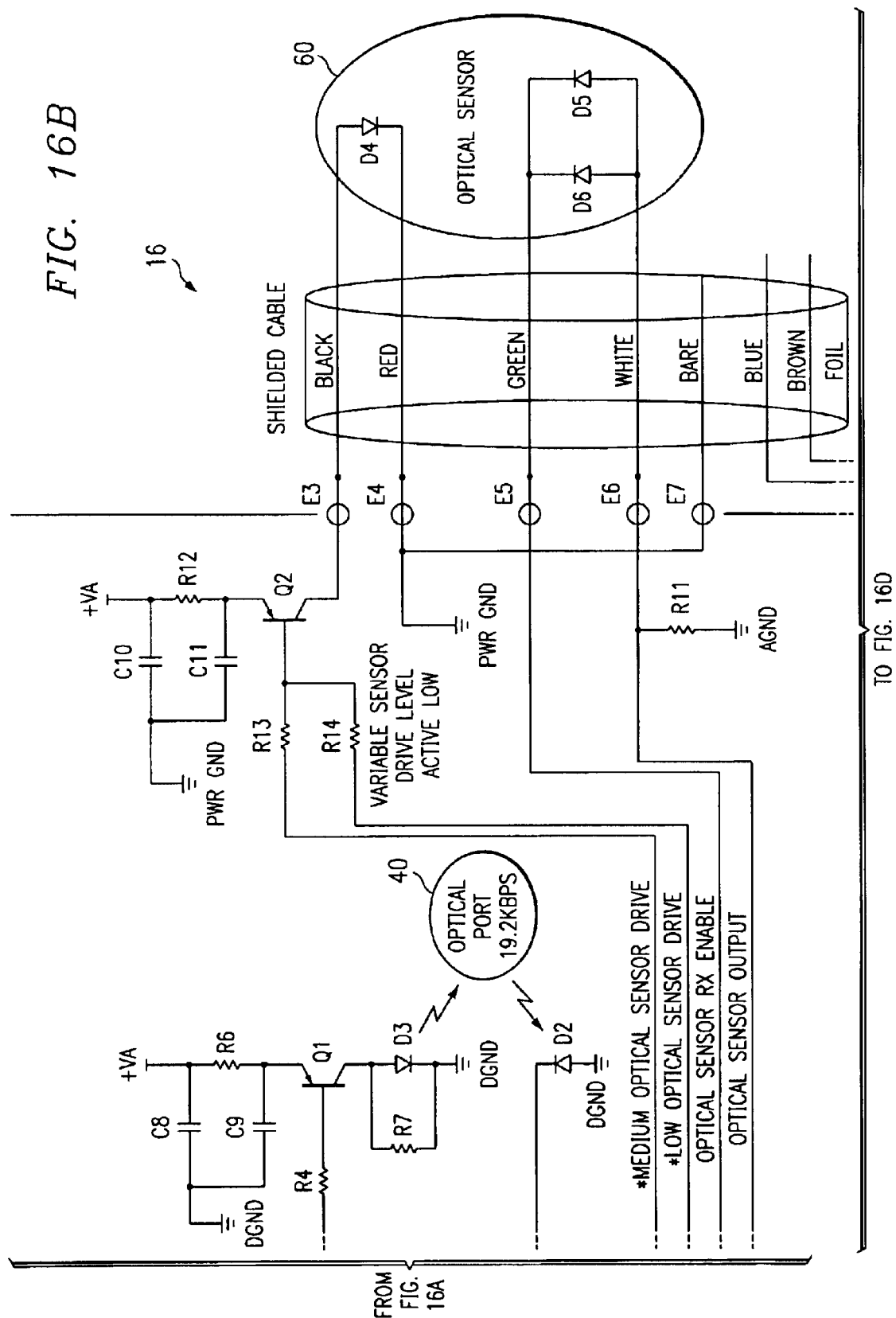
Figure 16C:
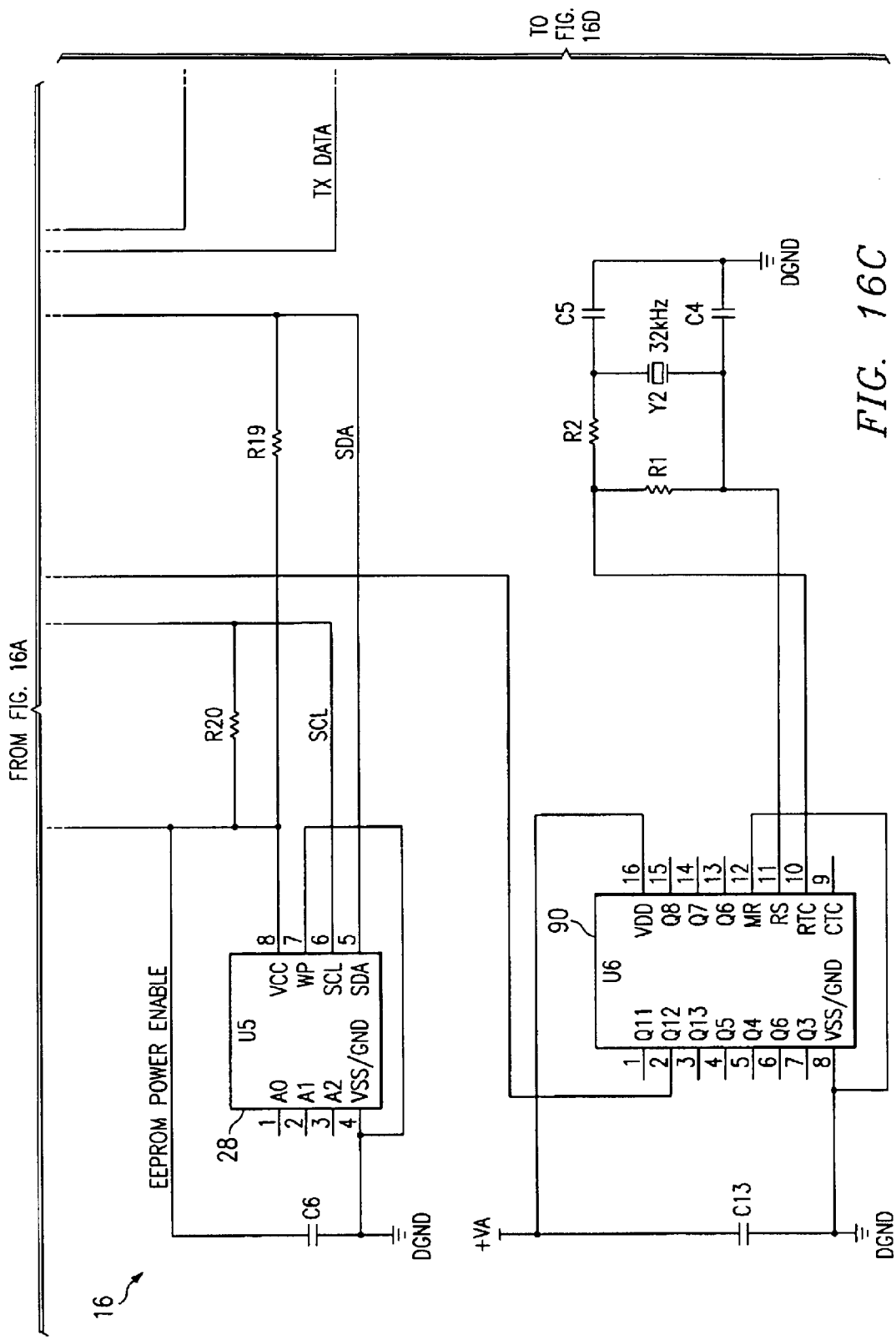
Figure 16D:
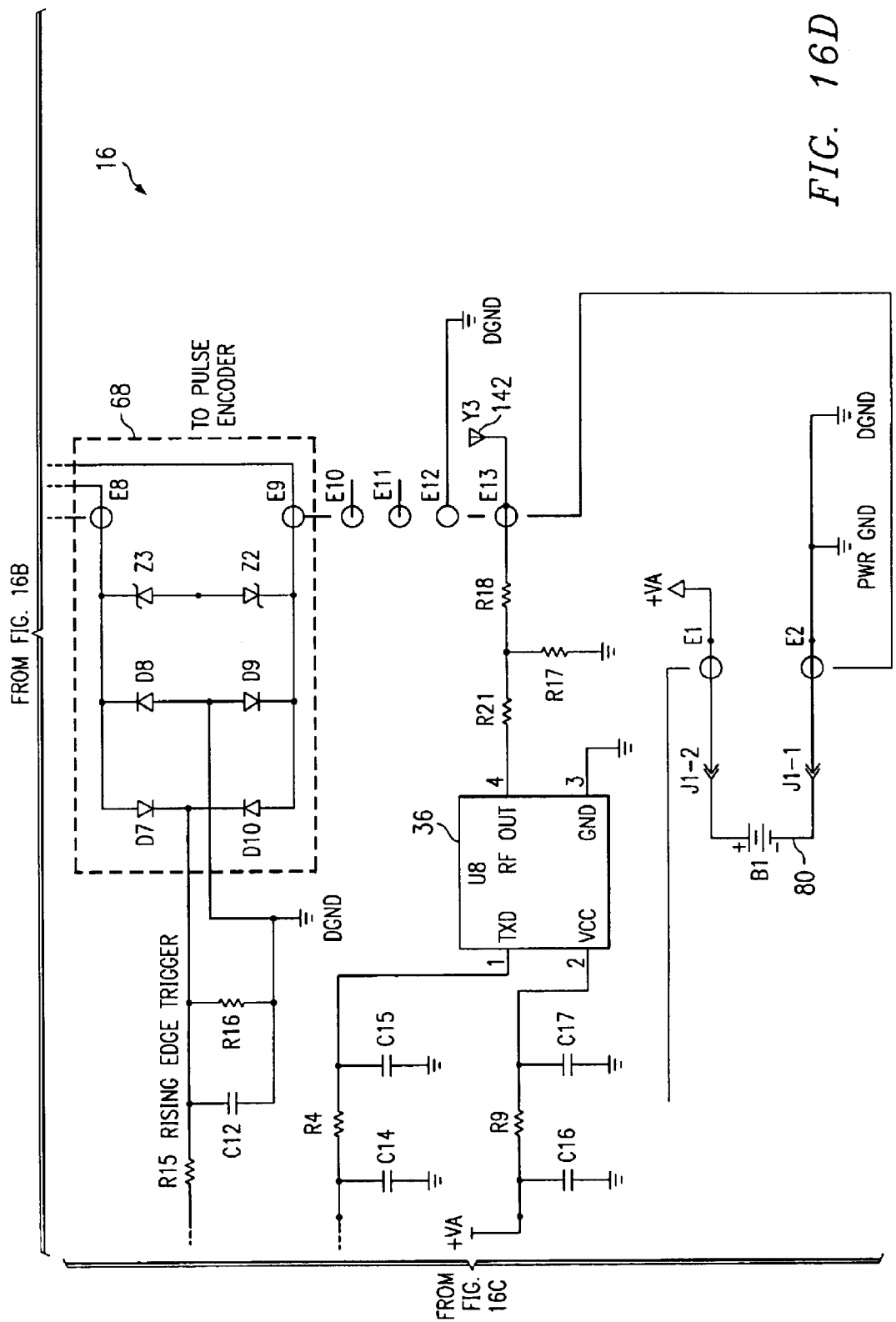

Referring now to FIG. 15, there is illustrated a detailed schematic diagram of the electric meter unit 12, wherein like numerals shown in FIG. 3 refer to like elements.

Referring now to FIG. 16 there is illustrated a detailed schematic diagram of the water meter unit 16, shown in FIG. 4, wherein like numerals refer to like elements.

Figure 17B:
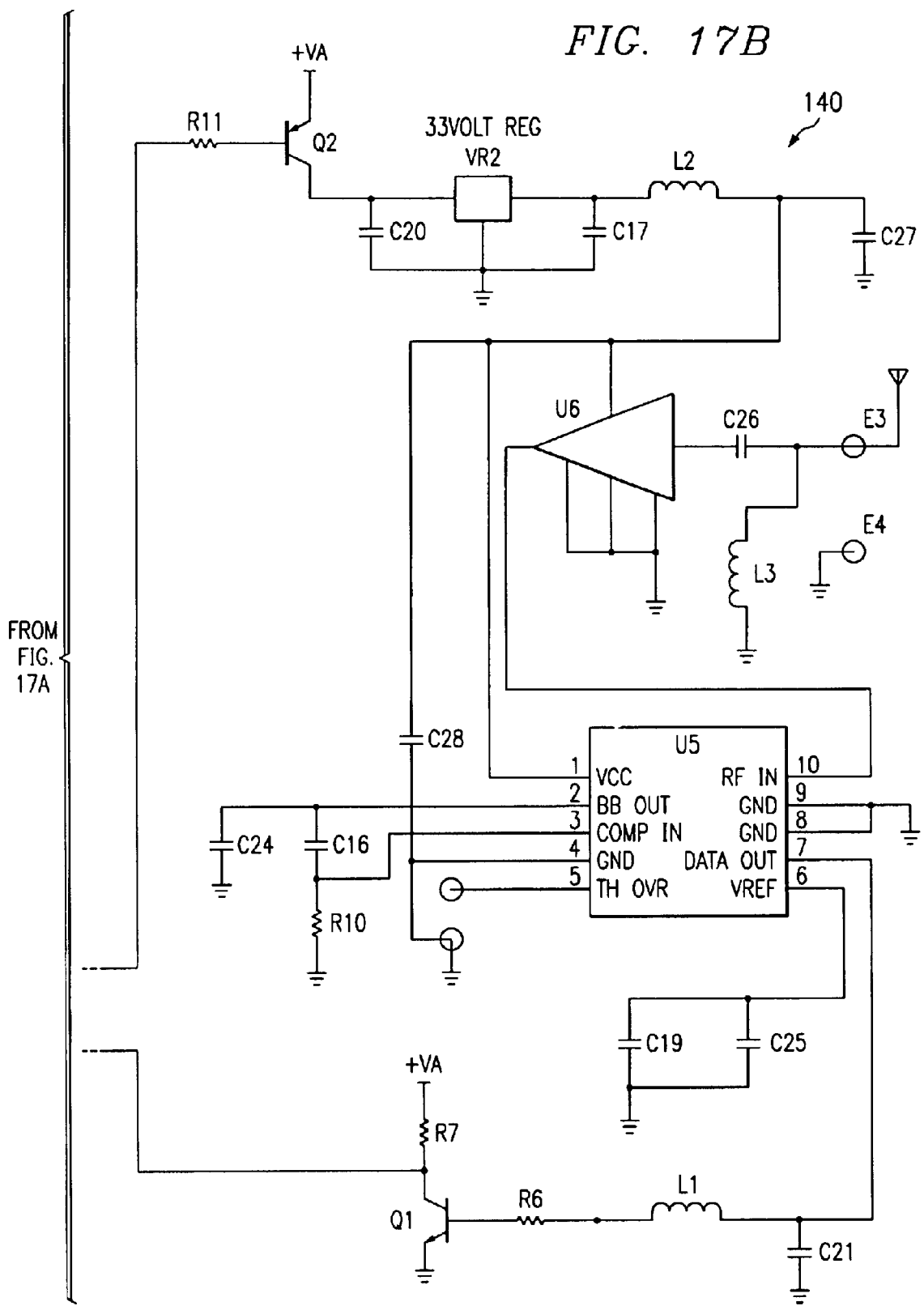
FIG. 17 is a full schematic diagram of a receiver adapted to receive and process modulated data signals from the data transmitting devices according to the present invention.
Figure 17C:
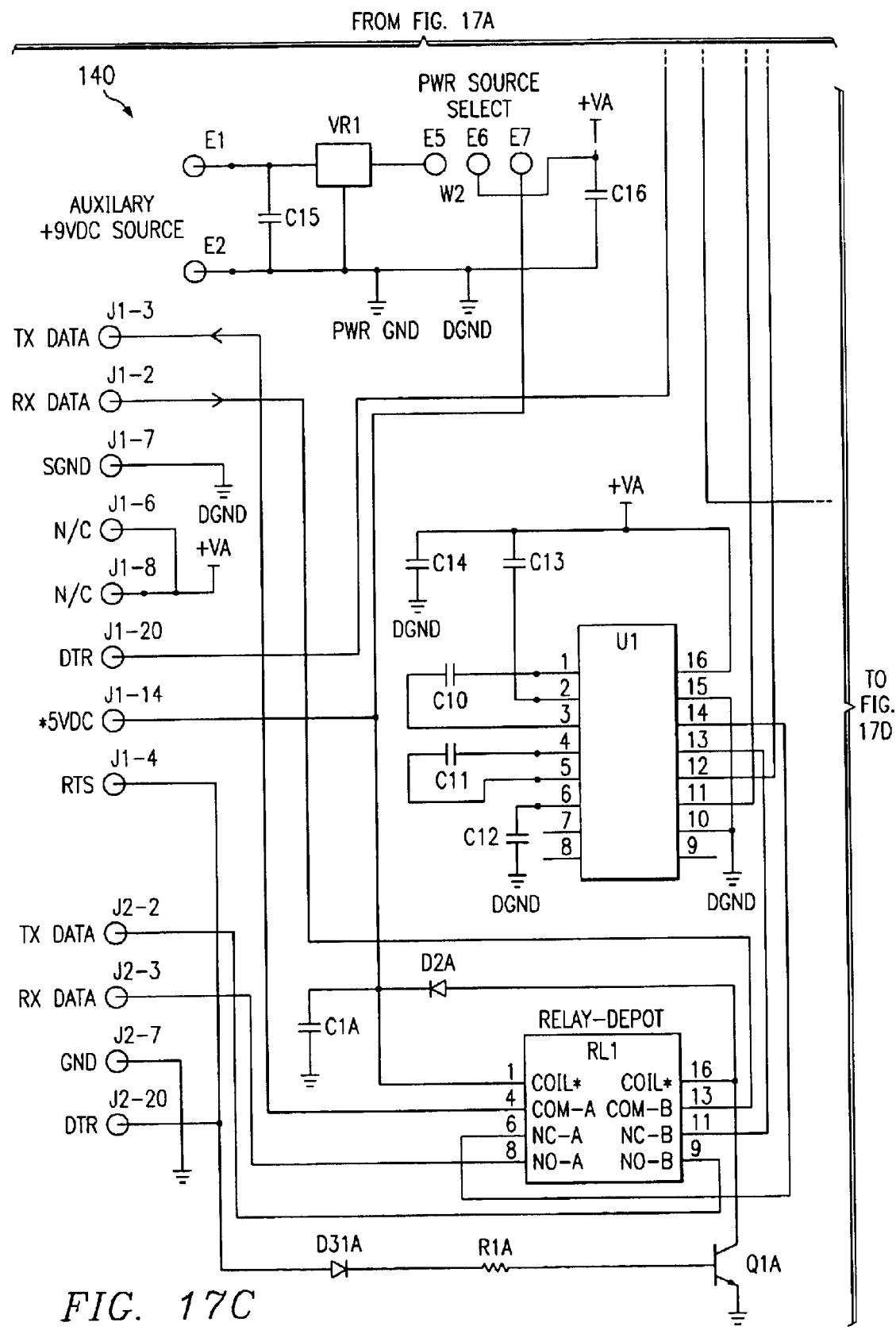
Figure 17D:
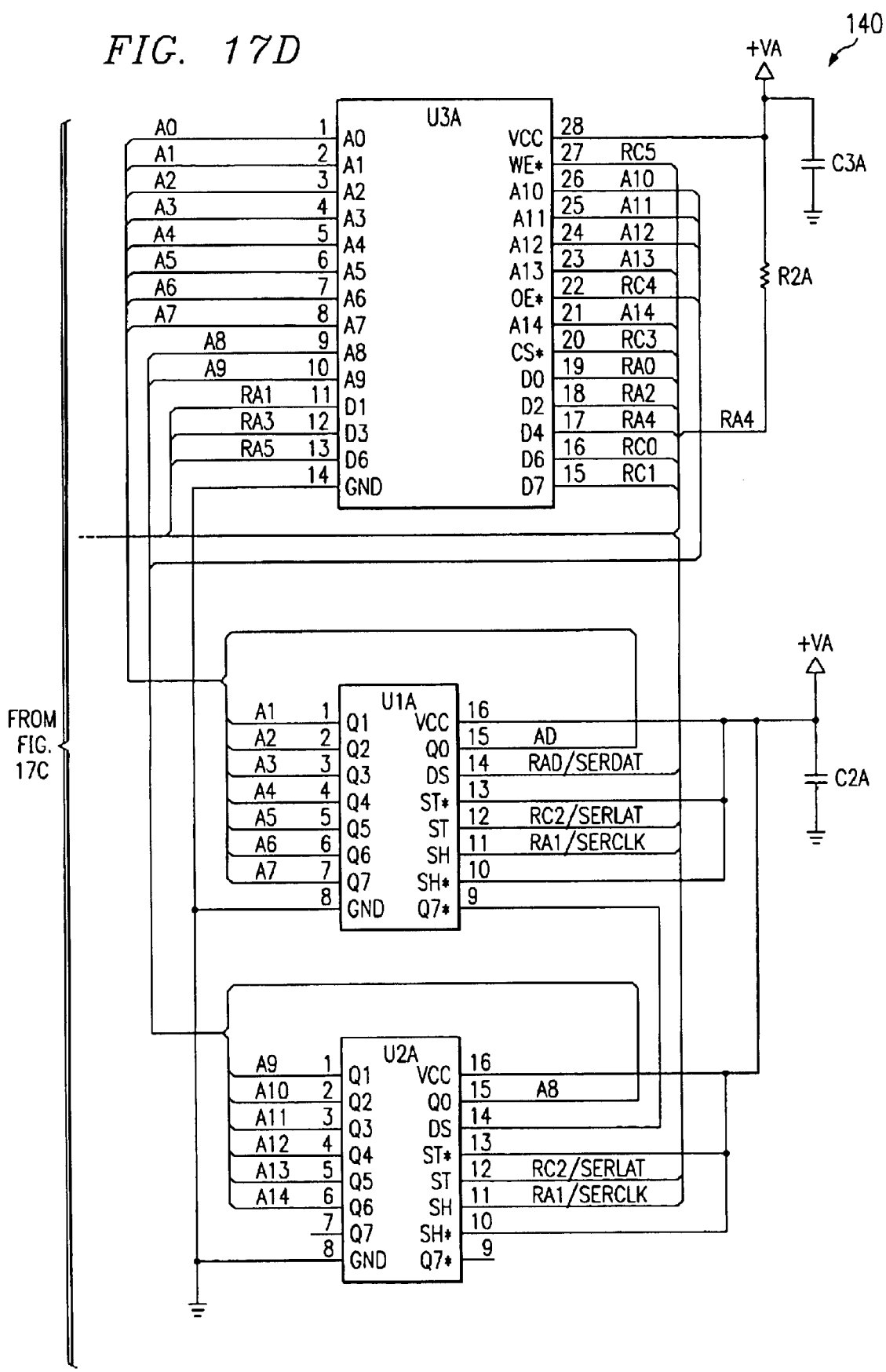

Referring now to FIG. 17, there is illustrated a detailed schematic diagram of an external receiver unit adapted to receive and intelligently decode the modulated formatted data signals provided on RF carrier 110 by the RF transmitter 36. This receiver 140 both demodulates the RF carrier, preferably operating at 916.5 MHz, at 9600 baud, and decodes the demodulated signal to ascertain the data in the fields of message 120 shown in FIG. 7. This receiver unit 140 has memory for recording all data collected from the particular sensored units being monitored by a field operator driving or walking in close proximity to the particular measuring unit, whether it be a water meter, gas meter or electric meter, depending on the particular meter being sensed and sampled. All this data is later downloaded into remote computers for ultimate billing to the customers, by RF carrier or other communication means.

In a preferred embodiment, the RF carrier 110 is generated at about 1 milliwatt, allowing for receiver 140 to ascertain the modulated data signal at a range of about 1,000 feet depending on RF path loss. The RF transmitters 36 are low power transmitters operating in microburst fashion operating under part 15 of the FCC rules. The receiver 140 does not have transmitting capabilities. The receiver is preferably coupled to a hand held computer (not shown) carried by the utility meter reader who is walking or driving by the meter location.

In the case of the electric meter unit 12, the device obtains electrical power to operate from the utility side of the power line to the meter and is installed within the glass globe of the meter. The main circuit board of this device doubles as a mounting bracket and contains a number of predrilled holes to accommodate screws to attach to various threaded bosses present in most electric meters.

In the case of the water meter, electric power is derived from the internal lithium battery. The water meter unit 12 resides under the pit lid of the water meter unit, whereby the antenna 142 is adapted to stick out the top of the pit lid through a pit lid opening to facilitate effective RF transmission of the RF signal to the remote receiver 140.

The present invention derives technical advantages by transmitting meter unit information without requiring elaborate polling methodology employed in conventional mobile data collection units. The meter units can be programmed when installed on the meter device, in the case of the water and gas meters, or when installed in the electric meter. The external programming diagnostic device 42 can communicate with the optical port 40 of the units via infrared technology, and thus eliminates a mechanical connection that would be difficult to keep clean in an outdoor environment. Also, the optical port 40 of the present invention is not subject to wear and tear like a mechanical connection, and allows communication through the glass globe of an electric meter without having to remove the meter or disassemble it. In the case of the electric meter, the present invention eliminates a potential leakage point in the electric meter unit and therefore allows a more watertight enclosure.

The transmitting meter units of the present invention can be programmed by the utility to transmit at predetermined intervals, determined and selected to be once ever second to up to several hours between transmissions. Each unit has memory 28 to accommodate the storage of usage profile data, which is defined as, a collection of meter readings at selected intervals. For example, the unit can be programmed to gather interval meter readings ever hour. If the unit is set to record interval readings every hour, the memory 28 may hold the most recent 72 days worth of interval data. This interval data constitutes the usage profile for that service point. Typically, the utility uses this information to answer customer complaints about billings and reading and as a basis for load research studies.

The profile intervals are set independently of the transmitting interval and the device does not broadcast the interval data. The only way this interval data can be retrieved by the utility is to attach the programming unit 42 to the meter unit of the present invention and download the file to a handheld or laptop computer. With the programming unit 42, one can determine the status of the battery on the water meter which is including in the profile data.

The present invention allows one to selectively set the transmission intervals thereby controlling the battery life. The longer the interval, the longer the battery life. In the case of electric meter unit, power is derived directly from the utility side of the electric service to the meter. The battery on the water meter unit is not intended to be field replaceable. In order to control cost, the water meter product is designed to be as simple as possible with the water meter unit enclosure being factory sealed to preserve the watertight integrity of the device. Preferably, a D size lithium cell is provided, and the unit is set to transmit once every second, providing a battery life of about 10 years. The water meter unit of the present invention can be fitted to virtually any water meter in the field and the utility can reap the benefits of the present invention without having to purchase a competitor's proprietary encoder and software. In the case of existing water meters that incorporate an encoder which senses the rotation of the water meter, these encoders incorporate wire attachments points that allow attachments to the manufactures proprietary AMR device. The present invention derives advantages whereby the sensor 60 of the present invention can be eliminated, with the sensor cable 66 being coupled directly to the terminals on the encoder of this type of device.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

I claim:

1. A device for connecting to a meter, comprising:
   an interface module adapted to coupled to said meter having a rotating disk, said interface having an optical transmitter directing optical energy to the rotating disk, the interface module sensing a rotating marker on said disk and generating a first signal indicating the direction of disk rotation;
   a controller receiving said first signal, said controller generating a data signal indicative of a measured quantity and generating profile data;
   a wireless transmitter, responsively coupled to said controller, modulating said data signal and transmitting said modulated data signal at a fixed predetermined RF frequency at a user selectable first predetermined time interval adapted to reduce interference without requiring external polling;
   a profile module that obtains and stores the profile data at profile time intervals being substantially longer than the first predetermined time interval, wherein the device is operable from an internal power source; and
   an output port for outputting profile data to a reading unit.

2. The device specified in claim 1 wherein said measured product comprises electricity.

3. The device specified in claim 1 wherein said measured product comprises gas.

4. The device specified in claim 1 wherein said measured product comprises a fluid.

5. The device specified in claim 4 wherein said usage profile data is adapted to be obtained by a remote user.

6. The device specified in claim 1 wherein the device includes a module, remotely accessed by a field technician, to selectively adjust said predetermined time interval between transmissions of said modulated data signal by said transmitter.

7. The device specified in claim 1 wherein said device includes a transceiver.

8. The device specified in claim 7 wherein said transceiver is adapted to provide data to a remote field diagnostic device indicative of operating characteristics of said device.

9. The device specified in claim 8 wherein said controller is adapted to provide meter's meter number and meter reading via said transceiver.

10. The device specified in claim 8 wherein said controller is adapted to adjust a sensitivity of said interface module.

11. The device specified in claim 7 wherein said transceiver is adapted to permit polling of said controller and generate a second signal indicative of variations of said controller circuit since a prior polling.

12. The device specified in claim 1 wherein said interface module comprises an optical sensor.

13. The device specified in claim 7 wherein the transceiver comprises an IR transceiver.

* * * * *